(12) United States Patent
Skultety-Betz et al.

(10) Patent No.: US 7,764,061 B2
(45) Date of Patent: Jul. 27, 2010

(54) METHOD FOR DETECTING OBJECTS ENCLOSED IN A MEDIUM, AND MEASURING DEVICE FOR CARRYING OUT THE METHOD

(75) Inventors: Uwe Skultety-Betz, Leinfelden-Echterdingen (DE); Bjoern Haase, Stuttgart (DE); Kai Renz, Leinfelden-Echterdingen (DE); Reiner Krapf, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/814,426

(22) PCT Filed: Mar. 14, 2006

(86) PCT No.: PCT/EP2006/060697

§ 371 (c)(1),
(2), (4) Date: Jul. 20, 2007

(87) PCT Pub. No.: WO2006/103162

PCT Pub. Date: Oct. 5, 2006

(65) Prior Publication Data

US 2008/0129275 A1    Jun. 5, 2008

(30) Foreign Application Priority Data

Apr. 1, 2005 (DE) .................... 10 2005 015 326

(51) Int. Cl.
  *G01R 19/00* (2006.01)
(52) U.S. Cl. ..................................... 324/67; 324/76.11
(58) Field of Classification Search .............. 324/76.11, 324/67
  See application file for complete search history.

(56) References Cited

U.S. PATENT DOCUMENTS

| 5,619,128 A | 4/1997 | Heger |
| 5,649,546 A | 7/1997 | Steinbeck |
| 2005/0002017 A1* | 1/2005 | Haran ........................ 356/73.1 |

FOREIGN PATENT DOCUMENTS

DE  42 00 518  7/1993

* cited by examiner

*Primary Examiner*—Vincent Q Nguyen
(74) *Attorney, Agent, or Firm*—Michael J. Striker

(57) ABSTRACT

In a method for detecting objects enclosed in a medium, a measurement signal correlated with an enclosed object is measured and used to generate a second signal, which reflects the measured signal strength of the measurement signal in a segmented manner by associating intervals of the signal strength of the measurement signal with individual segment units of the second signal, and the threshold values of the individual segment units of the second signal are varied depending on the measured signal strength of the measurement signal.

17 Claims, 4 Drawing Sheets

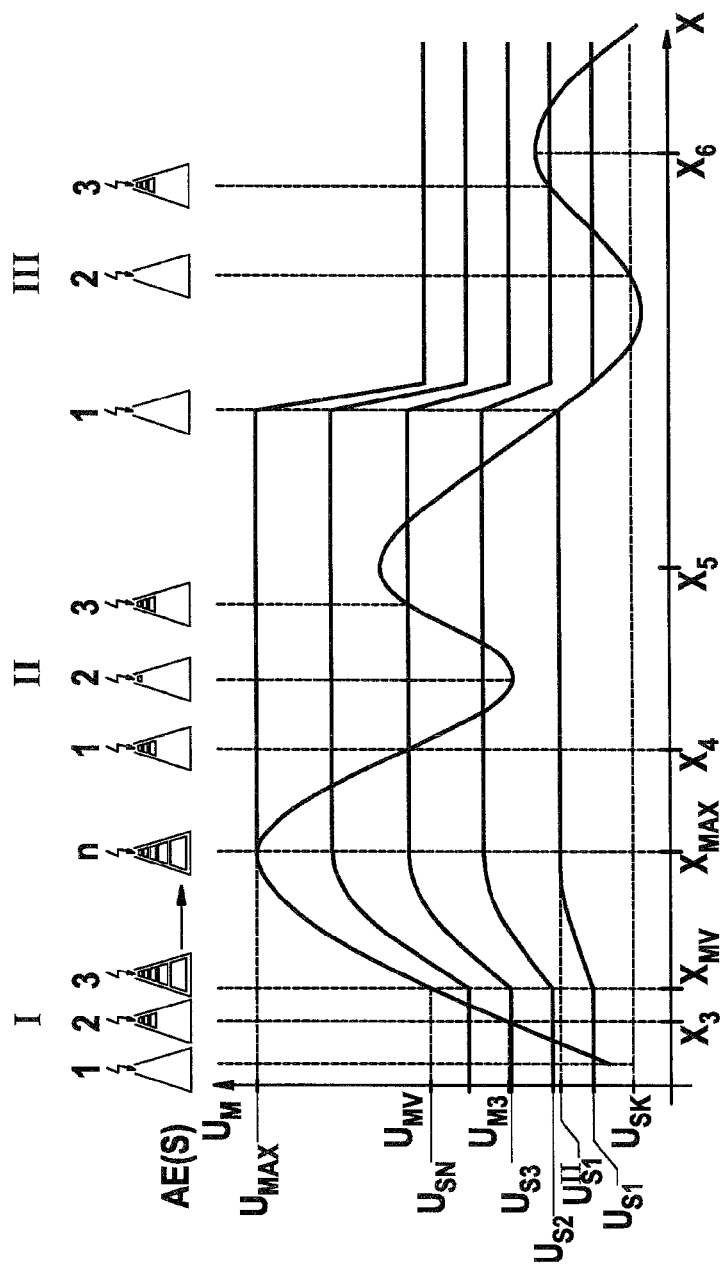
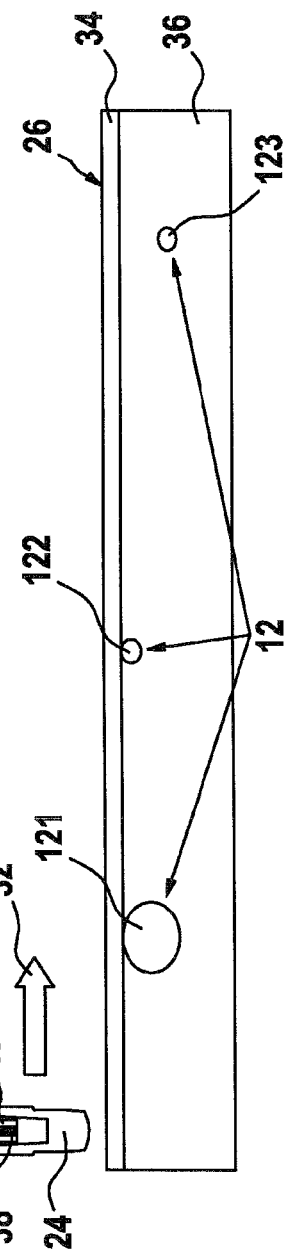
Fig. 2a
Fig. 2b
Fig. 2c

METHOD FOR DETECTING OBJECTS ENCLOSED IN A MEDIUM, AND MEASURING DEVICE FOR CARRYING OUT THE METHOD

CROSS-REFERENCE TO A RELATED APPLICATION

The invention described and claimed hereinbelow is also described in German Patent Application DE 10 2005 015 326.7 filed on Apr. 1, 2005. This German Patent Application provides the basis for a claim of priority of invention under 35 U.S.C. 119(a)-(d).

BACKGROUND OF THE INVENTION

Locating devices have been used for a long time to detect objects—such as electrical cables, water lines, pipes, metallic framework or wooden beams—enclosed in a medium, e.g., in a wall, ceiling, or floor. These devices include inductive devices, i.e., devices that produce a magnetic field that is disturbed by the metallic objects enclosed in a medium. In addition to these inductive devices, capacitive devices, mains voltage detectors, and high-frequency detectors are also used. With mains voltage detectors or AC detectors, only a receiving conductor loop system is used to detect the desired signal and, therefore, to locate an object.

A problem associated with these devices in particular is the enormous dynamics of the sensors used that exists even though the measuring device has been calibrated; this results in a variation of the signal intensity of the measurement signal that is detected. In order to detect as many metallic objects of different sizes and embedded depth—i.e., the distance of the enclosed object from the measuring device—as possible using metal-locating devices, a large dynamic range must be covered. The large dynamic range of the measurement signal from sensors of this type results from the depth of the objects to be measured in the enclosing medium, and from the characteristic properties of the particular material to be detected. For example, the sensor signal or measurement signal generated by a copper cable located deep inside a wall is smaller—by several magnitudes—than that produced by an iron pipe located 2 cm inside the wall.

With many of the known locating devices, particularly metal-locating devices or mains-voltage locating devices, it is therefore often possible to manually adjust the sensitivity of the sensor, i.e., for the user to manually adjust the sensitivity of the sensor. Rotary potentiometers, e.g., with an associated rotating wheel installed on the housing of the locating device, are used for this purpose.

With other locating devices, the sensitivity of the sensor and, therefore, the intensity of the detected measurement signal, can be regulated by recalibrating the device for the objects that are present.

With devices of this type, however, it is difficult to detect and/or exactly locate objects of different sizes, e.g., copper cables and steel beams, with one device setting. If the signal intensity of the detected measurement signal is too great, for example, this results in overdrive of the receiving amplifier of a sensor of this type. It is so critical because, in this case, it is no longer possible to detect an increase or decrease in a signal over a wide range, although this must be done in order to locate an enclosed object exactly. In a case such as this, an enclosed object causes maximum deflection of the measuring device over a broad lateral range, so that the user is still uncertain as to the exact position of the object. Nor is it possible, e.g., to detect objects that are located close to each other as two separate objects.

Several proposed designs for detecting signals with large dynamics are known in the related art.

It is possible, e.g., to design the display of the measuring device such that the entire dynamic range is depicted. This is realizable, e.g., by using a logarithmic scale for the display size, which is correlated with the measurement signal. The disadvantage of a depiction of this type, however, is the fact that weak and very strong objects appear at the beginning and the end of the dynamic range of the displayed scale and are therefore very difficult to identify or locate, since the changes displayed in the display of the measuring device are relative small due to the scale that is used.

Publication DE 42 00 518 A1 makes known a metal detector with which metal hidden in a wall can be located and its depth determined using a sensor provided with two coil pairs. The two coil pairs of the sensor described in DE 4200518 A1 are each connected with an oscillator, and they oscillate continually at different frequencies. The signals, which are influenced by the metal, are measured and weighted for the evaluation. An intensity display on the measuring device characterizes the position of the metal for a user. To measure the depth of the hidden metal, i.e., to determine the depth of the enclosed object relative to the surface of a wall, a floor, or the like, a boosting device on the measuring device is actuated once the metal is located in order to boost the metal detector by a defined amount. The depth of the hidden metal is calculated by performing a second measurement and taking into consideration the predefined changed distance from the wall surface. A manually operated marking device makes it possible to characterize the location of the measurement and the enclosed object.

SUMMARY OF THE INVENTION

The object of the present invention is to provide a method for detecting objects enclosed in a medium, which ensures that the objects can be detected as exactly as possible.

In keeping with these objects and with others which have become apparent hereinafter, one feature of the present invention resides, briefly stated, in a method for detecting objects enclosed in a medium, with which a measurement signal ($U_M$) correlated with an enclosed object is measured and used to generate a second signal (S), which reflects the measured signal strength of the measurement signal ($U_M$) in a segmented manner by associating intervals of the signal strength of the measurement signal ($U_M$) with individual segment units of the second signal (S), wherein the threshold values ($U_{Sn}$) of the individual segment units of the second signal (S) are varied depending on the measured signal strength of the measurement signal ($U_M$).

Another feature of the present invention resides in a measuring device, particularly a hand-held locating device, for carrying out the method of the present invention.

The inventive method and a measuring device for carrying out this method make it advantageously possible to generate a second signal, which is correlated with the measurement signal of the detection measurement; this makes it possible to easily depict a measurement signal that varies across a large dynamic range. With the inventive method, a measurement signal correlated with an enclosed object is measured, and this measurement signal is used to generate a second signal that depicts the measured signal strength of the measurement signal, e.g., in a segmented manner. Intervals of the signal strength of the measurement signal are assigned to individual segment units of the second signal. According to the present invention, the threshold values of the individual segment units of the second signal are varied and updated depending on the signal strength of the measurement signal that is measured.

In addition to a segment display, this type of display control can also be realized as matrix displays, on which, e.g., a bar display is displayed in a stepless manner or as a symbolized pointer.

This makes it advantageously possible to depict measurement signals of different sizes on the same scale that is visible to a user.

In an advantageous embodiment, the threshold values of the individual segment units of the second signal are varied starting at a predefined, initial segmentation. It is particularly advantageous that the threshold values of the individual segment units of the second signal are raised only when the signal strength of the measurement signal exceeds a predefined first limit value.

In an embodiment of this type, a measuring device that operates using the inventive method has a predefined, initial segmentation that converts the measurement signal correlated with an enclosed object into a segment depiction, e.g., a bar display, that is easy for a user to understand. Provided that the measurement signals being measured currently remain below the maximum signal size that can be depicted using the predefined, initial segmentation, this predefined initial segmentation is used in the inventive method. The threshold values of the individual segment units of the second signal are not increased until the measurement signal correlated with an enclosed object reaches a signal strength that cannot be depicted with the predefined, initial segmentation, since this signal strength of the measurement signal would result in a full-scale deflection of the segmented second signal.

Advantageously, the first, predefined limit value for the signal strength of the measurement signal corresponds to the maximum signal strength of the measurement signal depictable with the initial segmentation.

If the signal strength of the measurement signal increases beyond this first, predefined limit value, the threshold values of the individual segment units are raised if a new maximum signal strength is measured. The threshold values of the individual segment units of the second signal are therefore raised as the signal strength of the measurement signal increases if a first limit value of the measurement signal strength is exceeded.

In an advantageous embodiment of the inventive method, the threshold values of the individual segment units are raised such that the maximum measurement signal depictable with the updated segmentation corresponds to the newly measured maximum signal strength of the measurement signal. When the measurement signal correlated with an enclosed object reaches a new maximum value, a new segmentation of the second signal that delivers the information to a user is advantageously calculated. It is therefore possible to depict a basically unlimited dynamic range of the measurement signal using a finite dynamic range for the second signal to be communicated to the user. In this manner it is possible to depict every measurement signal that is measured with a predefined type of depiction, without a high dynamic range of the measurement signal resulting in a widespread range of measured values displayed to a user.

If the signal strength of the currently measured measurement signal falls below the smallest threshold value of the current segmentation, the threshold values of the individual segment units of the second signal are recalculated and lowered, in this case in particular. The threshold values of the individual segment units are not lowered below the initial segmentation for the second segment, however.

The threshold values of the individual segment units of the second signal are advantageously reset to a predefined, initial segmentation if the signal strength of the measurement signal falls below a second limiting value.

The threshold values of the individual segment units of the second signal are advantageously and automatically calculated by a control routine depending on the particular signal strength of the measurement signal correlated with an enclosed object, and they are set by this routine. With the inventive method, it is not necessary for a user to intervene, e.g., to switch between various dynamic ranges for an output unit.

The inventive method measures the measurement signal correlated with an enclosed object as a function of a lateral displacement of a sensor. A sensor is displaced, e.g., moved, in the lateral direction over an enclosed object, and the corresponding signal strength of the measurement signal correlated with the enclosed object is measured as a function of the location and converted to a second segmented signal, which is brought to a user's attention.

The inventive method is advantageously realized using a measuring device, particularly by a hand-held locating device for locating objects enclosed in a medium. A measuring device of this type includes an output unit with which an output variable correlated with the measurement signal can be reproduced in a segmented manner. Via this output unit, a user of the measuring device or the inventive method on which is it based is notified of the segmented second signal derived from the measurement signal.

This output unit can be, e.g., an optical output unit in the form of a display.

In an advantageous embodiment of the inventive measuring device, the optical display unit makes it possible for the second signal to be reproduced in the form of a bar display or a bar diagram. Other types of depictions are also possible. Alternative output units are also possible. It should be noted in particular that the inventive method is also realizable with an acoustic output unit, for example. The segmentation can take place, e.g., in the form of repeat frequencies or audio frequencies.

A measuring device that operates according to the inventive method, e.g., a locating device, advantageously includes at least one sensor that includes a receiving conductor loop system. In this manner, current-carrying cables can be detected, for example, by measuring, e.g., the voltage induced in the receiving conductor loop system, e.g., a coil.

Alternative embodiments of an inventive measuring device can also include at least one transmission coil and at least one receiving coil, which can be formed, e.g., by a receiving conductor loop system. An object enclosed in a medium generates an induction voltage in a sensor of this type in a known manner; the induction voltage can be measured, e.g., directly or in a processed form as a measured signal that is correlated with the enclosed object.

With a locating device, particularly a hand-held locating device, an output variable correlated with the measurement signal is reproduced via the output unit; the signal strength of the measurement signal is depicted in segment units, and the intervals are assigned to the signal strength of the measurement signal. According to the inventive method, the threshold values of the individual segment units of the output variable are adjusted depending on the measured signal strength of the measurement signal.

For example, the measurement voltage induced in the sensor described can be advantageously converted into a second signal variable due to an enclosed object, the second signal variable being reproduced in the form of a segmented bar diagram. The length of the bar represents the signal strength of the measurement signal. The individual segments of the bar are assigned to intervals of the measurement signal, i.e., the induction voltage, for example, although the interval of the signal strength assigned to a bar segment is recalculated and adjusted depending on the maximum signal strength of the measurement signal.

The inventive method and the measuring device that operates based on the inventive method therefore makes it easily possible to depict measurement signals that vary over a large dynamic range.

Further advantages of the inventive method and a locating device that operates using this method are disclosed in the drawing below and the associated description.

An exemplary embodiment of the inventive method and an inventive locating device is depicted in the drawing, and they are described in greater detail in the subsequent description. The figures in the drawing, their descriptions, and the claims contain numerous features in combination. One skilled in the art will also consider these features individually and combine them to form new, further reasonable combinations that are therefore also considered to be disclosed in this text.

BRIEF DESCRIPTION OF THE DRAWINGS

FIG. 2a shows a measurement situation with an inventive locating device, FIG. 2b shows the course of measurement signal $U_M$ detected in a measurement according to FIG. 2a, and the segmentation carried out based on the particular measurement signal that was measured and using the inventive method, in a schematicized depiction, FIG. 2c shows the output variable resulting from the segmentation according to FIG. 2b, in a schematicized depiction.

DESCRIPTION OF THE PREFERRED EMBODIMENTS

Figure 1:
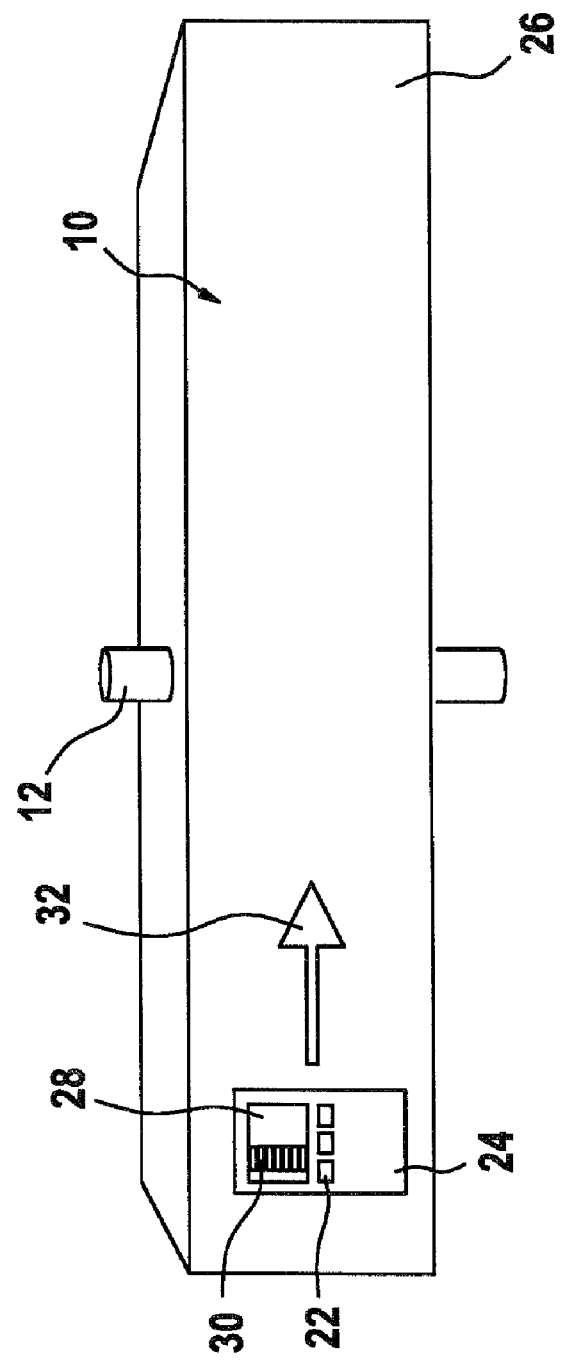
FIG. 1 shows a typical measurement situation for locating an object enclosed in a medium, in a schematicized depiction.

FIG. 1 shows a typical measurement situation for locating objects enclosed in a medium 10, e.g., a wall, a floor, or a ceiling. A locating device 24 is moved along surface 26 of a medium 10 to be investigated in order to detect, i.e., locate, the position of an object 12 enclosed in medium 10. An object 12 of this type can be, e.g., an electrical cable, a pipe, e.g., a water pipe, metallic framework, or other objects, such as wooden beams. A locating device 24 of this type can include, in particular, an inductive sensor with at least one transmission coil and a receiving conductor loop system that serves as a receiving unit. A measuring device of this type can also be, e.g., a mains voltage detector, which only includes a receiving conductor loop system, e.g., a coil, as the sensor for detecting the measurement signal.

The measuring device can also include a combination of various sensors.

If an object is now present in the vicinity of a receiving geometry, this object modifies the field generated by the transmission geometry so that a resultant flux is induced in the receiving coil. The flux induced in the receiving coil and/or a receiving conductor loop system can then be tapped as the measurement voltage, e.g., at the coil or downstream measuring amplifiers. The detected measurement signal, e.g., tapped measurement voltage $U_M$, is that much greater the closer the inductive sensor comes to the enclosed object.

When a locating device 24 of this type approaches an enclosed object 12, as would be the case, e.g., by moving it in the direction of arrow 32 shown in FIG. 1, the detected measurement signal increases.

With devices according to the related art in particular, measurement situations can now occur in the vicinity of enclosed object 12 in which the measurement signal is so strong across a greater displacement path of locating device 24 in the region of object 12 to be detected that the maximum deflection of the output quantity, e.g., tapped measurement voltage $U_M$, is displayed across the entire range. In this case it would not be possible to locate enclosed object 12 exactly. A locating device 24 of this type includes, in addition to control electronics, the associated energy supply and an evaluation unit for the detected measurement signal, e.g., a graphical display 28 that displays an output quantity that is correlated with the intensity of the detected measurement signal. The output quantity can be depicted, e.g., in the form of a bar diagram 30, in which the number of illuminated bars between a minimum value and a maximum value is a measure of the intensity of the measurement signal. In addition to the depiction of the output quantity using a bar diagram 30 as shown in FIG. 1, other output forms are possible, particularly further optical depictions.

FIG. 2a shows a modified measurement situation, in which three objects 12 (121, 122, 123) of different sized are enclosed in a medium 36. In addition, these objects are also located at different distances from surface 26 of a wall 34. With the measurement situation described with reference to FIG. 2a, a measuring device—a locating device in this case for locating objects enclosed in a medium—is slid, e.g., moved, in arrow direction 32, i.e., laterally over surface 26 of a wall 34, and a measurement signal $U_M$—e.g., a voltage induced in a receiving system and which is correlated with objects 12—is measured. The course of measurement voltage $U_M$ is depicted as a function of lateral position X of the measuring device on wall 34 is shown in FIG. 2b.

The detected measurement signal has different signal strengths depending on different material properties, and, e.g., the different size or different distance of the enclosed objects from surface 26 of wall 34 to be investigated. A measurement signal of this type can vary across several magnitudes, thereby making it difficult to depict a measurement signal of this type in an easily understood manner.

The inventive method to be described below makes it possible to depict—in an optical display 40—detected measurement signal $U_M$, which varies over a large dynamic range, using an output unit AE of measuring device 24, e.g., in the form of a segmented bar diagram 38.

The inventive method, which converts detected measurement signal $U_M$ into a segmented output signal S is explained below using the measurement situation in FIGS. 2a and 2b as an example.

The inventive method uses a first, fixed threshold $U_{SK}$ and several further thresholds $U_{S1}$ through $U_{Sn}$, which can be varied. When an inventive measuring device is activated, i.e., switched on, it has an initial, predefined segmentation, i.e., a series of threshold values $U_{SK}$ through $U_{Sn}$, as shown under position I in FIG. 2b and FIG. 2c, and in FIG. 3. This initial, predefined segmentation is high-resolution, thereby making it possible to also detect very small objects that generate very weak signal strengths. With this segmentation, which is depicted under I in FIGS. 2b and 2b, a full-scale deflection of the display means is attained very quickly when large objects are approached.

When measuring device 24 is moved, e.g., in the direction of arrow 32 toward a large object 121, as shown in FIG. 2a, measurement signal $U_M$ increases rapidly as object 121 is approached, as shown in FIG. 2b. If measurement signal $U_M$ exceeds a segment threshold $U_{Sn}$, a second signal S is generated out of measurement signal $U_M$, which is depicted in an output unit of the measurement device, e.g., in display 40 shown in FIG. 2a. A bar of a bar diagram can be generated, e.g., for each threshold $U_{Sn}$ exceeded by the measurement signal, as shown in FIG. 2c. (See also AE(S)). For example, output unit AE displays three segment units for this second signal S at a position $X_3$ of the measuring device, since corresponding measurement signal $U_{M3}$ has exceeded three dynamic thresholds $U_{Sn}$. The display of output unit AE in this case is shown under I2 in FIG. 2c. At a position $X_V$, detected measurement signal $U_M$ reaches a value $U_{MV}$, which results in a full-scale deflection of display unit AE given the initial segmentation shown in depiction 1, as shown under I3 in FIG. 2c.

When this threshold value $U_{MV}$ is exceeded, which results in a full-scale deflection of output unit AE which is depicting the second signal, threshold values $U_{S1}$ through $U_{Sn}$ are recalculated. That is, when there is a full-scale deflection of the display, the thresholds for the individual display elements are adjusted according to the current signal strength of the measurement signal.

When measuring device 24 is now slid from position $X_V$ further in arrow direction 32 toward object 121, the signal strength of measurement signal $U_M$ increases, as do threshold values $U_{S1}$ through $U_{Sn}$. The threshold values are adapted to the current maximum signal strength $U_{max}$, so that display unit AE shows a full-scale deflection over this range, as indicated by arrow 42 in FIG. 2c.

Since a constant full-scale deflection is displayed in output unit AE in this case, a further signal can also be transmitted to a user, which indicates that the measured value is still increasing. This additional signal could be, e.g., a measurement signal $U_M$ correlated with an enclosed object.

If the currently measured measurement signal $U_M$ drops again relative to maximum value $U_{Max}$ that is measured while measuring device 24 is continually slid in arrow direction 32, the most recently calculated segmentation of second signal S, i.e., the value gradation of the individual segment thresholds, is retained, as shown over range II in FIG. 2b. Due to the segmentation, which has now changed compared to the rising flank in region I in FIG. 2b, second signal S generated from the measurement signal and visualized using display unit AE now drops off more rapidly as the distance from signal-producing object 121 increases. At a position $X_4$, for example, with the original segmentation, a full-scale deflection of second signal S would still be generated on output unit AE, while only three segments are depicted with the current threshold value setting. (See position II1 in FIG. 2c)

Due to the inventive dynamic threshold adaptation, second signal S—which is communicated to a user via output unit AE—has already dropped off markedly at position I1, thereby making it possible to more precisely locate the enclosed object—object 121 in this case—at position $X_{max}$.

Provided that measurement signal $U_M$ currently being measured does not exceed maximum threshold value $U_{SN}=U_M$ as the measurement continues, the threshold values are not raised, i.e., increased, any further. For example, although a relative maximum of measurement signal $U_M$—which is due to enclosed object 122—is generated at position $X_5$, the signal strength of the measurement signal only exceeds the currently set, third threshold value of the segmentation at this point. (See position II3 in FIGS. 2a and 2b) For this reason, second signal S generated based on measurement signal $U_M$ and which is displayed, is only composed of three segment units, as indicated under II3 in FIG. 2c.

If the current signal strength of measurement signal $U_M$ now falls below a predefined threshold value $U_{G2}$, which is equal to current value $U_{S1(II)}$ of the lowest threshold in the exemplary embodiment in FIG. 2b, the threshold values are now recalculated. In the exemplary embodiment in FIG. 2, for example, the threshold values are reset to the values of the initial segmentation. If the current measurement signal then exceeds the lowest threshold value once more, second signal S—which is used in the display—is generated based on the signal strength of measurement signal $U_M$, which could be visualized as a bar segment in this case.

As an alternative, it would also be feasible—instead of waiting until the smallest current threshold value is fallen below again to reduce the threshold values once more—to, e.g., travel back along the thresholds in a stepwise manner as the signal strength of the measurement signal decreases once a maximum has been reached.

At a position $X_6$ shown in FIG. 2b, current measurement signal $U_M$ reaches a further local maximum $U_{M6}$ because another enclosed object 123 has been reached. Since the measurement signal has exceeded the second dynamic threshold at this point, the second display signal is generated, according to the present invention and based on this measurement signal, with two segments, e.g., two bar elements, as shown in FIG. 2c under III3.

The raising or lowering of threshold values can be carried out using different algorithms. For example, the threshold values could be raised equidistantly, i.e., linearly, or, e.g., logarithmically or possibly also exponentially. Other functional dependencies between the individual threshold values are also possible in principle, however.

Figure 3:
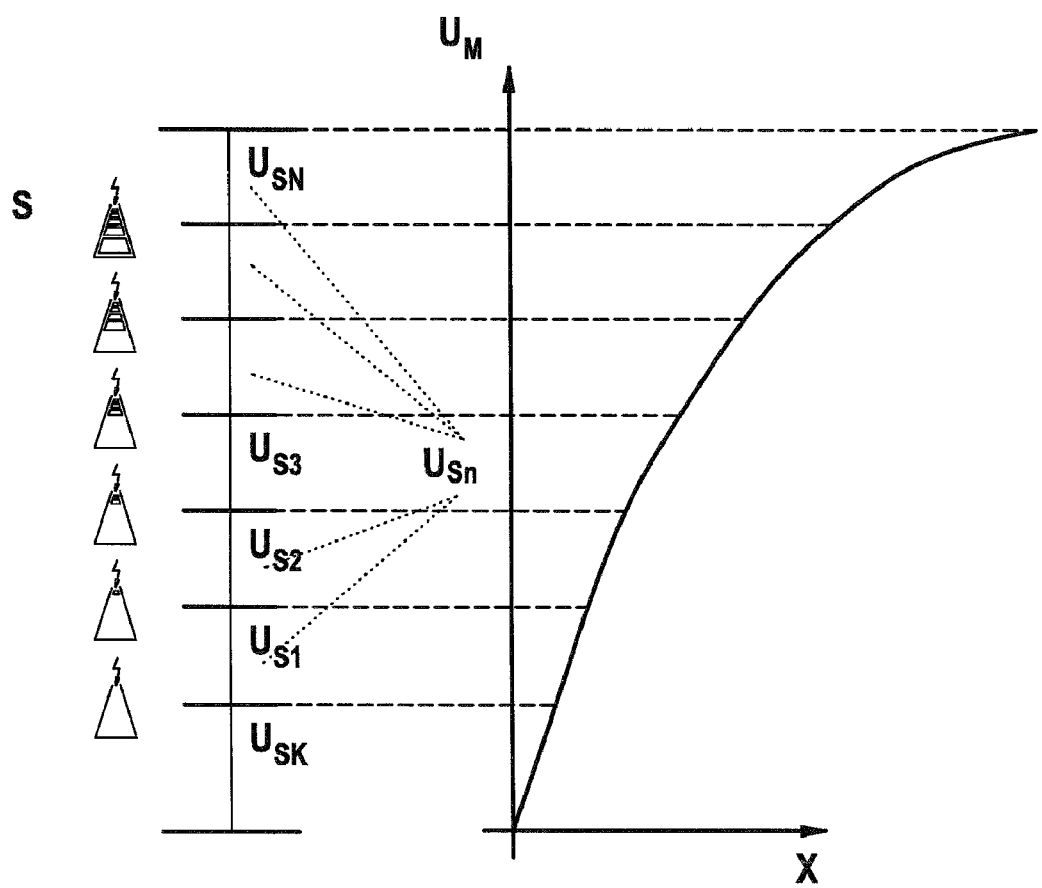
FIG. 3 shows an example of a predefined, initial segmentation, in a schematic depiction, and an associated depiction of output variable S.

FIG. 3 shows the segmentation once more on which the inventive method is based, in a highly schematicized depiction. The measurement system has a constant threshold $U_{SK}$ and several dynamically adaptable thresholds $U_{S1}$ through $U_{SN}$. If the signal strength of the measurement signal—which can be, e.g., the voltage induced in a coil—exceeds the threshold value of first dynamic threshold $U_{S1}$, a second signal S is generated based on the measurement signal, which is communicated to a user of the inventive method via an output unit AE, e.g., a display 40. This second signal S can be realized, e.g., in the form of a bar display 38, as shown schematically in the far-left column in FIG. 3.

As the signal strength increases, a further segmented signal element of the second signal is generated when the next higher threshold value $U_{Sn}$ is exceeded.

When the signal strength of measurement signal $U_M$ reaches maximum threshold value $U_{SN}$, threshold values $U_{Sn}$ are recalculated. Threshold values $U_{Sn}$ are therefore raised, i.e., increased, as the signal intensity increases, and threshold values $U_{Sn}$ of the individual segment units are adapted to new maximum signal strength $U_{max}$. The threshold values are raised such that the maximum measurement signal depictable with the updated segmentation corresponds to the newly measured, maximum signal strength.

This type of display control is not limited to a segment display, in principle. It is also possible, e.g., to realize this type of display control using a matrix display, with which, e.g., a bar display is depicted in a stepless manner, or a graphically generated pointer element is displayed and moved in accordance with the signal strength of the measurement signal. A type of display control can also be implemented using analog instruments, e.g., by regulating the amplification in order to therefore adaptively adjust the dynamic range. In this manner, the matrix display or a corresponding analog instrument can always be adapted perfectly to the measured data, i.e., the signal strength of the measurement signal correlated with an enclosed object.

Figure 4:
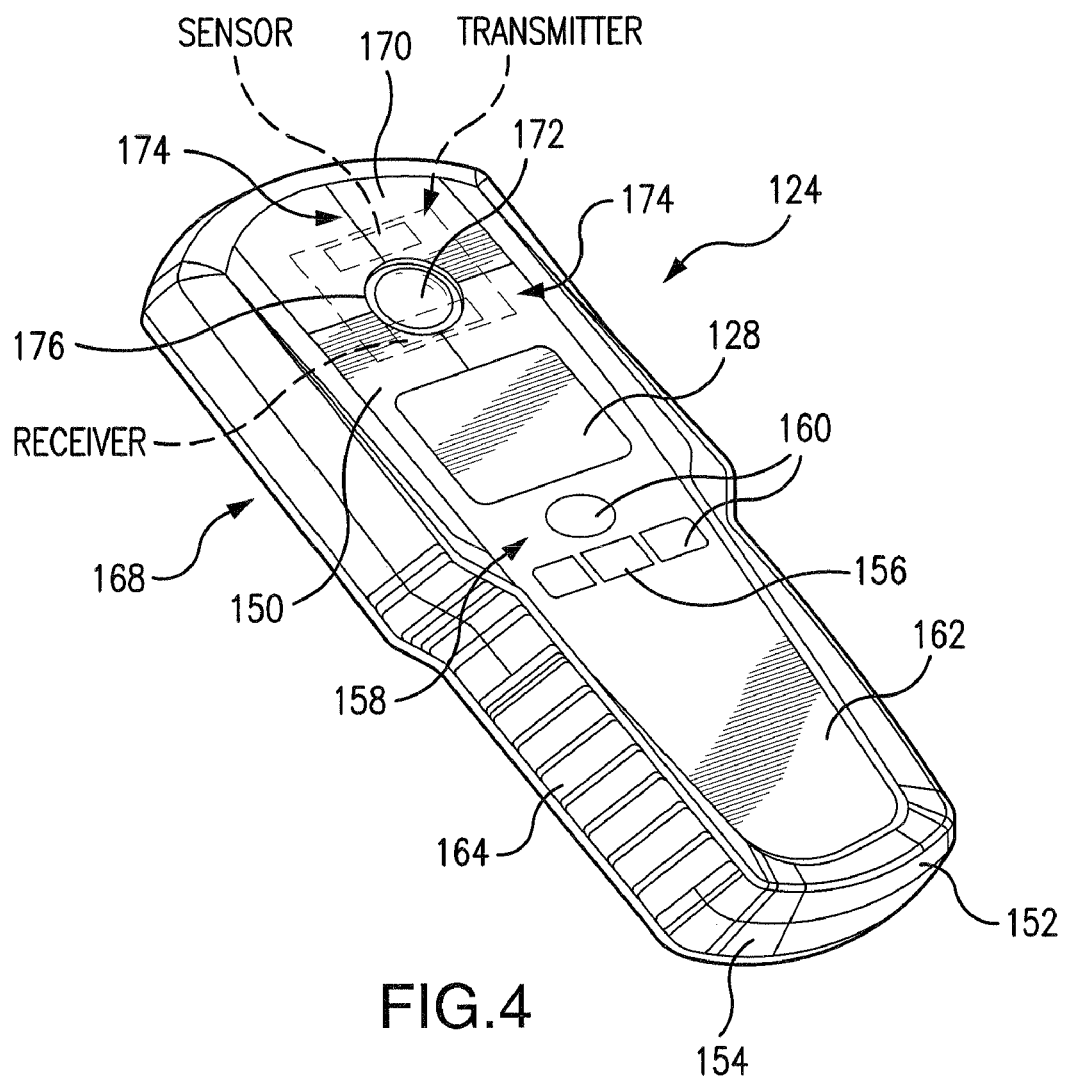
FIG. 4 shows a perspective view of an exemplary embodiment of an inventive measuring device.

FIG. 4 shows an exemplary embodiment of an inventive measuring device in a perspective view.

FIG. 4 shows an inventive measuring device 124 in a perspective overview. The measuring device includes a housing 150, which is composed of a top half shell 152 and a lower half shell 154. At least one sensor with a receiving conductor loop system, e.g., a coil configuration, is provided inside the housing. Further sensors, e.g., inductive or capacitive sensors, can also be integrated in measuring device 124. Signal generation and evaluation electronics, and an energy supply, e.g., batteries or rechargeable batteries, are also located inside measuring device 124. The measuring device shown in FIG. 4 also includes a display 128 for outputting an output signal correlated with the measurement signal. Via display 128, e.g., a segmented bar display or a graphical display using an LCD, it is possible to depict the intensity of detected measurement signal $U_M$ directly, or to depict signal S derived therefrom in a segmented manner. With display 128, it is also possible to display the measurement signal from a first detector, e.g., an inductive locating device, directly, and to not depict the measurement signal, e.g., from a mains voltage detector or an AC detector, directly, but rather in segmented form S described originally.

The inventive measuring device also includes a control panel 158 with a row of control elements 160 that make it possible to turn the device on or off, or to start a measurement or calibration procedure.

In the region below control panel 158, the measuring device according to FIG. 5 includes a region 162, which is designed—via its shape and material—as handle 164 for guiding the inventive measuring device. Using handle 164, the measuring device is guided via its underside—which is opposite to the observer of FIG. 4—along a surface of an object or a medium to be investigated, such as surface 26 of a wall 10 shown schematically in FIG. 3.

Measuring device 124 has an opening 172 that penetrates the housing on side 170 of measuring device 124 opposite to handle 164. Opening 172 is located concentrically with receiving conductor loop system 134 of the sensor, at the least. In this manner, the location of opening 172 in the measuring device is also the center of the locating sensor, thereby ensuring that the exact position of an object to be detected is also displayed simultaneously to the user of a device of this type. On its top side, the measuring device also includes marking lines 174, via which the user can locate the exact center of opening 172 and, therefore, the position of an enclosed object. Opening 172 is enclosed by a semi-transparent sleeve 176, into which the light from different light-emitting diodes can be directed. If the measuring device detects an object, the sleeve can be illuminated red, for example, in order to communicate to the user that an object has been located where opening 172 is, and he should therefore avoid drilling a hole at this point, for example. A green light can be directed into the sleeve, e.g., to signal to a user that an object has not been located, and he can, e.g., drill a hole in the region of opening 172 of the measuring device.

It is also possible and advantageous to integrate a sensor according to the inventive method directly or as an add-on part in a machine tool, e.g., in a drilling tool, to enable a user to work confidently with this machine.

The inventive method and a measuring device that operates using this method are not limited to the exemplary embodiment depicted in the Figures.

In particular, the inventive method is not limited to the use of only one receiving coil and/or one receiving conductor loop system. A related measuring device, e.g., a locating device, could also include an inductive compensation sensor. A sensor of this type includes, e.g., three coils. A first transmission coil is connected to a first transmitter, a second transmission coil—if present—is connected to a second transmitter, and a receiving conductor loop system that serves as a receiving coil is connected to a receiver. The two transmission coils are supplied with alternating currents of a frequency $f_M$ and opposed phase by their transmitters. The first transmission coil induces a flux in the receiving coil, which is oriented in the opposite direction from the flux induced in the receiving coil by the second transmission coil. The two fluxes induced in the receiving coil therefore compensate each other. As such, the receiver does not detect a received signal in the receiving coil if an external, metallic object is not located near a coil assembly of this type. Flux $\phi$ excited by the individual transmission coils in the receiving coil depends on various quantities, e.g., the number of windings and the geometry of the coils, and on the amplitudes of the currents supplied to the two transmission coils, and on the mutual phase angle of these currents. With detectors of these types, these quantities must ultimately be optimized so that the least amount of flux $\phi$ possible is excited in the receiving coil if a metallic object is not present.

As an alternative, it is possible to use only one transmission coil and to position the receiving winding system three-dimensionally such that no voltage is induced when there are no metallic objects present in the receiving conductor structures.

It is also possible to combine several sensors and different measurement principles (capacitive sensor, inductive sensor, or a mains voltage sensor) in one measuring device.

What is claimed is:

1. A method for detecting objects (12) enclosed in a medium (10), comprising: a measurement signal (UM) correlated with an enclosed object is measured and used to generate a second signal (S), which reflects the measured signal strength of the measurement signal (UM) in a segmented manner by associating intervals of the signal strength of the measurement signal (UM) with individual segment units of the second signal (S), wherein the threshold values (Usn) of the individual segment units of the second signal (S) set by a control routine are varied depending on the measured signal strength of the measurement signal (UM).

2. The method as recited in claim 1, wherein the threshold values ($U_{Sn}$) of the individual segment units are varied starting with a predefined, initial segmentation.

3. The method as recited in claim 1, wherein the threshold values ($U_{Sn}$) of the individual segment units are increased when the signal strength of the measurement signal ($U_M$) exceeds a predefined, first limit value ($U_{G1}$).

4. The method as recited in claim 3, wherein the predefined, first limit value ($U_{G1}$) corresponds to the maximum signal strength ($U_{MV}$) of the measurement signal ($U_M$) depictable with the initial segmentation.

5. The method as recited in claim 3, wherein the threshold values ($U_{Sn}$) of the individual segment units are varied if a new maximum signal strength ($U_{max}$) is measured; the threshold values ($U_{Sn}$) are raised as the signal strength of the measurement signal ($U_M$) increases.

6. The method as recited in claim 5, wherein the threshold values ($U_{Sn}$) of the individual segment units are raised such that the maximum measurement signal ($U_{MV}$) depictable with the updated segmentation S corresponds to the newly measured, maximum signal strength of the measurement signal ($U_{max}$).

7. The method as recited in claim 3, wherein the threshold values ($U_{Sn}$) of the individual segment units are lowered if the signal strength of the currently measured measurement signal ($U_M$) falls below the smallest threshold value ($U_{S1}$) of the current segmentation.

8. The method as recited in claim 7, wherein the threshold values ($U_{Sn}$) of the individual segment units are not lowered below an initial segmentation.

9. The method as recited in claim 1, wherein the threshold values ($U_{Sn}$) of the individual segment units are reset to a predefined, initial segmentation if the signal strength of the measurement signal ($U_M$) falls below a second limit value ($U_{G2}$).

10. The method as recited in claim 1, wherein the threshold values ($U_{Sn}$) of the individual segment units are set by a control routine depending on the signal strength of the measurement signal ($U_M$).

11. The method as recited in claim 1, wherein, the measurement signal ($U_M$) is measured as a function of a lateral displacement (X) of a sensor.

12. A measuring device, particularly a hand-held locating device (24, 124), for locating objects (12) enclosed in a medium, and for carrying out the method as recited in claim 1, wherein the measuring device (24, 124) includes an output unit (AE, 40) with which an output variable (S) correlated with the measurement signal ($U_M$) is reproduced in a segmented manner.

13. The locating device as recited in claim 12, wherein the output unit (AE, 40) is an optical output unit (40).

14. The locating device as recited in claim 13, wherein the output unit (40) makes it possible to reproduce the second signal (S) in the form of a segmented depiction, particularly a bar display (38).

15. The method as recited in claim 12, wherein the measuring device (12, 124) includes at least one receiving conductor loop system.

16. A measuring device, particularly a hand-held locating device (24, 124) for locating objects (12) enclosed in a medium comprising: a measurement signal ($U_M$) correlated with an enclosed object is measured and used to generate a second signal (S), which reflects the measured signal strength of the measurement signal ($U_M$) in a segmented manner by associating intervals of the signal strength of the measurement signal ($U_M$) with individual segment units of the second signal S wherein the threshold value ($U_{sn}$) of the individual segment units of the second signal (S) set by a control routine are varied depending on the measured signal strength of the measurement signal ($U_M$), wherein the measuring device (24, 124) includes an output unit (AE, 40) with which an output variable (S) correlated with the measurement signal ($U_M$) is reproduced in a segmented manner, wherein the measuring device (12, 124) includes at least one sensor that includes at least one transmission coil and at least one receiving conductor loop system, which are inductively coupled to each other.

17. A locating device, particularly a hand-held locating device, for detecting objects enclosed in a medium, with an output unit (AE, 40) for reproducing at least one output variable (S) correlated with a measurement signal (UM) from at least one sensor of the device; the signal strength of the measurement signal (UM) is output in segment units and the intervals are assigned to the signal strength of the measurement signal (UM), wherein the threshold values (Usn) of the individual segments set by a control routine are adjusted depending on the measured signal strength of the measurement signal (UM).

* * * * *